(12) United States Patent
Redfern et al.

(10) Patent No.: US 8,351,551 B2
(45) Date of Patent: Jan. 8, 2013

(54) OPPORTUNISTIC INTERMEDIATE FREQUENCY SELECTION FOR COMMUNICATION RECEIVERS

(75) Inventors: Arthur John Redfern, Plano, TX (US); Anand Ganesh Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1055 days.

(21) Appl. No.: 12/214,004

(22) Filed: Jun. 14, 2008

(65) Prior Publication Data

US 2009/0310721 A1     Dec. 17, 2009

(51) Int. Cl.
*H04L 27/14* (2006.01)

(52) U.S. Cl. .......................... 375/344; 375/316; 375/346

(58) Field of Classification Search .................. 375/344, 375/316, 346
See application file for complete search history.

(56) References Cited

U.S. PATENT DOCUMENTS

| | | | | |
|---|---|---|---|---|
| 5,416,422 A * | 5/1995 | Dildine | ........................... | 324/614 |
| 5,423,064 A * | 6/1995 | Sakata | ........................... | 455/437 |
| 6,029,058 A * | 2/2000 | Namgoong et al. | .......... | 455/324 |
| 6,707,858 B1 * | 3/2004 | Davie | ............................ | 375/316 |
| 6,868,128 B1 * | 3/2005 | Lane | ............................ | 375/319 |
| 7,054,607 B2 * | 5/2006 | Binshtok et al. | .............. | 455/311 |
| 7,155,196 B1 * | 12/2006 | Beard | ............................ | 455/339 |
| 7,221,917 B2 * | 5/2007 | Kroeger | ..................... | 455/192.2 |
| 7,424,278 B2 * | 9/2008 | Campbell et al. | ......... | 455/179.1 |
| 2004/0041554 A1 * | 3/2004 | Miyauchi | ................... | 324/76.19 |
| 2005/0143038 A1 * | 6/2005 | Lafleur | ......................... | 455/296 |
| 2007/0098118 A1 * | 5/2007 | Muhammad et al. | ......... | 375/344 |
| 2009/0203338 A1 * | 8/2009 | Darabi | ....................... | 455/226.2 |

OTHER PUBLICATIONS

Razavi, "Design Considerations for Direct Conversion Receivers," IEEE Trans. on Circuits and Systems—II: Analog and Digital Signal Processing, vol. 44, No. 6, pp. 428-435, (Jun. 1997).

Valkama et al., "Compensation of Frequency-Selective I/Q Imbalances in Wideband Receivers: Models and Algorithms," 2001 IEEE Third Workshop on Signal Processing Advances in Wireless Communications (SPAWC '01), pp. 42-45 (Mar. 2001).

\* cited by examiner

*Primary Examiner* — Siu Lee
(74) *Attorney, Agent, or Firm* — Ronald O. Neerings; Wade James Brady, III; Frederick J. Telecky, Jr.

(57) ABSTRACT

A method of selecting an intermediate frequency ($f_{IF}$) is disclosed (FIG. 7). The method includes measuring a first signal quality (704) on a first channel at a first intermediate frequency. The method further includes measuring a second signal quality (706) on the first channel at a second intermediate frequency. The intermediate frequency with the best signal quality is selected (710).

7 Claims, 6 Drawing Sheets

OPPORTUNISTIC INTERMEDIATE FREQUENCY SELECTION FOR COMMUNICATION RECEIVERS

BACKGROUND OF THE INVENTION

The present embodiments relate to communication systems and, more particularly, to opportunistic Intermediate Frequency (IF) selection to reduce Adjacent Channel Interference (ACI).

New standards for Digital Video Broadcast (DVB) standards are currently being developed to permit streaming video reception by portable user equipment. DVB typically uses carrier frequencies in the 470-800 MHz band. DVB packets or data streams are transmitted by Orthogonal Frequency Division Multiplex (OFDM) transmission with time slicing. With OFDM, multiple symbols are transmitted on multiple carriers that are spaced apart to provide orthogonality. An OFDM modulator typically takes data symbols into a serial-to-parallel converter, and the output of the serial-to-parallel converter is considered as frequency domain data symbols. The frequency domain tones at either edge of the band may be set to zero and are called guard tones. These guard tones allow the OFDM signal to fit into an appropriate spectral mask. Some of the frequency domain tones are set to values which will be known at the receiver, and these tones are termed pilot tones or symbols. These pilot symbols can be useful for channel estimation at the receiver. An inverse fast Fourier transform (IFFT) converts the frequency domain data symbols into a time domain waveform. The IFFT structure allows the frequency tones to be orthogonal. A cyclic prefix is formed by copying the tail samples from the time domain waveform and appending them to the front of the waveform. The time domain waveform with cyclic prefix is termed an OFDM symbol, and this OFDM symbol may be upconverted to a radio frequency (RF) and transmitted. An OFDM receiver may recover the timing and carrier frequency and then process the received samples through a fast Fourier transform (FFT). The cyclic prefix may be discarded and after the FFT, frequency domain information is recovered. The pilot symbols may be recovered to aid in channel estimation so that the data sent on the frequency tones can be recovered.

Several problems inherent in receiver design have been discussed by Razavi, "Design Considerations for Direct Conversion Receivers," IEEE Trans. on Circuits and Systems—II: Analog and Digital Signal Processing, Vol. 44, No. 6, pp. 428-435, (June 1997). Some of these problems are related to receivers which use an intermediate frequency (IF) while others are related to direct conversion receivers which directly convert a received radio frequency (RF) signal to a baseband signal without IF conversion. IF receiver architectures involve a tradeoff between image rejection and adjacent channel rejection. Direct conversion receiver signals may be degraded by DC offset, I/Q mismatch, even-order distortion, flicker noise, and local oscillator leakage.

Flicker noise is produced by analog components such as resistors. The resulting noise is greatest at DC and decays with increasing frequency. It is often referred to as 1/f noise. Flicker noise causes the portion of a signal originally at the local oscillator frequency ($f_C-f_{IF}$) to be noisy. With a zero IF architecture ($f_{IF}=0$) or direct conversion receiver, this noise is located in the center of the desired channel. However, if $|f_{IF}|>B/2+B_{flicker}$, the flicker noise is effectively pushed out of the desired signal bandwidth. Here, B is the bandwidth of the desired channel, and $B_{flicker}$ is the 1 sided bandwidth which captures the majority of the flicker noise.

Coupling from the local oscillator to the RF input of the mixer and between the low noise amplifier (LNA) of the receiver and the mixer produces a DC offset in the down converted signal. Like flicker noise, DC offset will affect the portion of the signal originally at the local oscillator frequency ($f_C-f_{IF}$). While it is possible to cancel the DC offset with a tracking loop in the digital domain, it is not necessarily convenient. For example, as the received signal strength changes, an automatic gain control (AGC) circuit will change the LNA gain, thereby changing the DC level. DC offset cancellation, therefore, must comprehend varying LNA gain. As with flicker noise, a simpler solution is to push the DC offset out of the bandwidth of the desired channel. This is accomplished when $|f_{IF}|>B/2+B_{DC}$, where $B_{DC}$ is the 1 sided bandwidth occupied by the DC offset.

Figure 2:
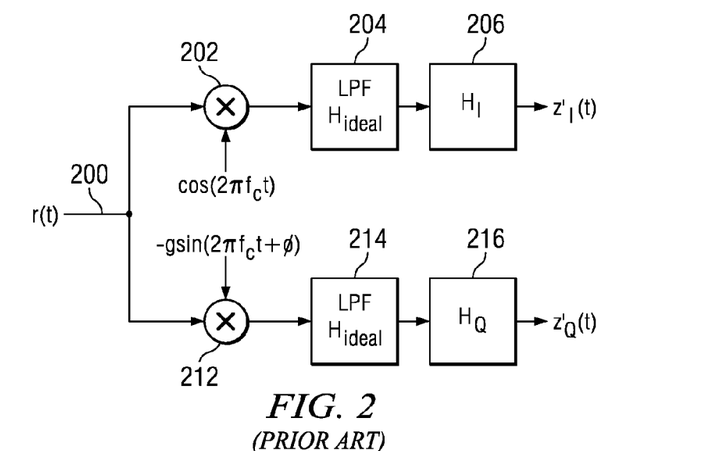
FIG. 2 is a model of a radio frequency (RF) front end of a receiver of the prior art showing in-phase and quadrature branches.

Valkama et al., "Compensation of Frequency-Selective I/Q Imbalances in Wideband Receivers: Models and Algorithms," 2001 IEEE Third Workshop on Signal Processing Advances in Wireless Communications (SPAWC '01), pp. 42-45 (March 2001) disclose a model of I/Q imbalance as shown at FIG. 2. The quadrature receiver of FIG. 2 receives a signal r(t) at lead 200. The in-phase branch includes mixer 202, low pass filter 204, and low pass filter imbalance 206, and produces in-phase signal $z'_I(t)$. Mixer 202 receives signal r(t) as well as the local oscillator signal $\cos(2\pi f_C t)$ and provides an IF signal to low pass filter 204. The low pass filter selects a desired one-sided bandwidth. The quadrature branch includes mixer 212, low pass filter 214, and low pass filter imbalance 216, and produces quadrature signal $z'_Q(t)$. Mixer 212 receives signal r(t) as well as the local oscillator signal $-g \sin(2\pi f_C t+\phi)$ and provides an IF signal to low pass filter 214. The low pass filter 214 selects a desired one-sided bandwidth. Here, the gain and phase imbalance of the mixer is respectively modeled as "g" and "$\phi$" in the local oscillator signal of the quadrature branch. Low pass filter imbalance in the model is represented by blocks 206 and 216 in the in-phase and quadrature branches, respectively. From this model, Valkama et al. derive a received frequency domain signal as shown at equations [1]-[3].

$$Z'(f)=G_1(f)Z(f)+G_2(f)Z^*(-f) \quad [1]$$

$$G_1(f)=(H_I(f)+ge^{-j\phi}H_Q(f))/2 \quad [2]$$

$$G_2(f)=(H_I(f)-ge^{-j\phi}H_Q(f))/2 \quad [3]$$

The first term $G_1(f)Z(f)$ of equation [1] is the desired signal. The second term $G_2(f)Z^*(-f)$ of equation [1] is a mirror image aliasing term due to I/Q imbalance in the receiver. This aliasing term can cause severe interference with the desired signal. Valkama et al. disclose Adaptive Interference Cancellation (IC) and Multichannel Blind Deconvolution (MBD) as methods of reducing the interference.

While the preceding approaches provide steady improvements in wireless communications, the present inventors recognize that still further improvements may be made by addressing some of the drawbacks of the prior art. In particular, the present inventors have recognized significant differences in interference due to the signal strength of adjacent channels. Accordingly, the preferred embodiments described below are directed toward these problems as well as improving upon the prior art.

BRIEF SUMMARY OF THE INVENTION

In a preferred embodiment of the present invention, there is disclosed a method of selecting an intermediate frequency. The method includes measuring a first signal quality on a first channel at a first intermediate frequency. The method further includes measuring a second signal quality on the first channel at a second intermediate frequency. Then the intermediate frequency with the best signal quality is selected.

DETAILED DESCRIPTION OF THE INVENTION

The preferred embodiments of the present invention provide improved immunity from adjacent channel interference (ACI) between user equipment (UE) and a base station for multiple service broadcast channels as in Digital Video Broadcast Handheld (DVB-H), integrated service for digital broadcast-terrestrial (ISDB-T), terrestrial digital media broadcast (T-DMB), and other transmission standards. The improved immunity is provided by opportunistic intermediate frequency (IF) selection in view of adjacent channel signal strength as well as in-channel noise components as will be explained in detail.

Figure 1:
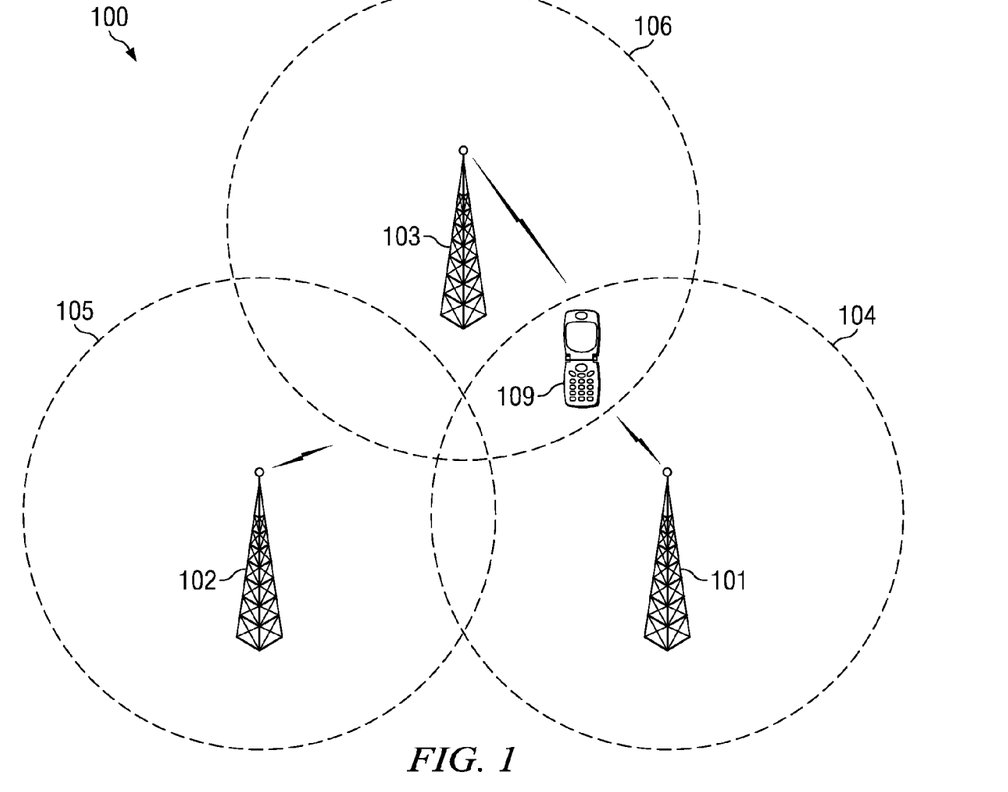
FIG. 1 is a diagram of a communication system of the present invention having three broadcast towers and a mobile receiver.

Referring to FIG. 1, there is an exemplary wireless telecommunications network 100. The illustrative telecommunications network includes broadcast towers 101, 102, and 103. Each broadcast tower 101, 102, and 103 is operable over corresponding coverage areas 104, 105, and 106. Handset or other UE 109 is shown in overlapping coverage areas 104 and 106, which are within range of broadcast towers 101 and 103, respectively. Broadcast towers 101, 102, and 103 are transmitting multiple broadcast channels. These broadcast channels may include streaming video, data, and other transmissions. Some of the broadcast channels are intended for UE 109. Other broadcast channels are not intended for UE 109 and may interfere with the intended broadcast channels. This may significantly degrade signals on the intended channels when the interfering channels are adjacent to the intended channels and have greater signal strength than the intended channels. In a preferred embodiment of the present invention, UE 109 monitors adjacent channels and selects an IF to minimize ACI as will be described in detail.

Figure 3A:
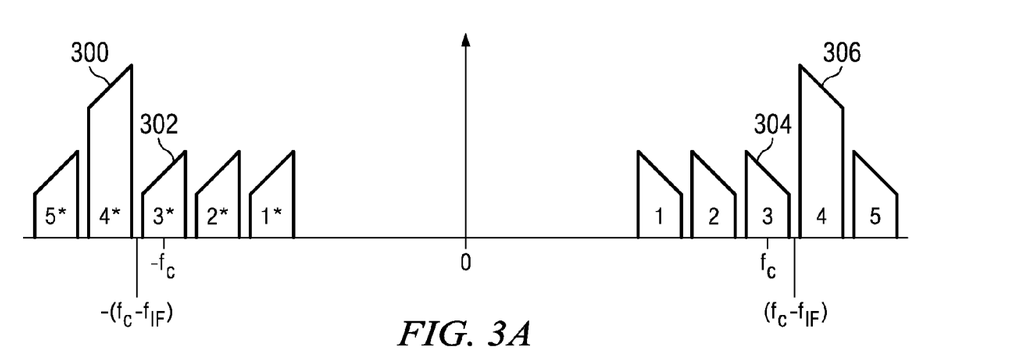
FIG. 3A is a diagram of five channels (1-5) and their alias images (1*-5*)

Referring now to FIG. 3A, there is a diagram of five channels (1-5) and their alias images (1*-5*). The alias images are due to an imbalance of in-phase and quadrature branches of the receiver (UE 109) as previously discussed. Each channel is represented by a trapezoid for simplicity for each of FIGS. 3A through 5B. The width of the trapezoid represents the bandwidth of the respective individual channel. The height of the trapezoid represents the respective signal strength of the channel. The desired channel 304 is indicated by center frequency ($f_C$). The alias image 302 is indicated by $-f_C$. Adjacent channel 306 has a significantly greater signal strength than desired channel 304. Likewise, the alias image 300 of adjacent channel 306 has a significantly greater signal strength than alias image 302.

Figure 3B:
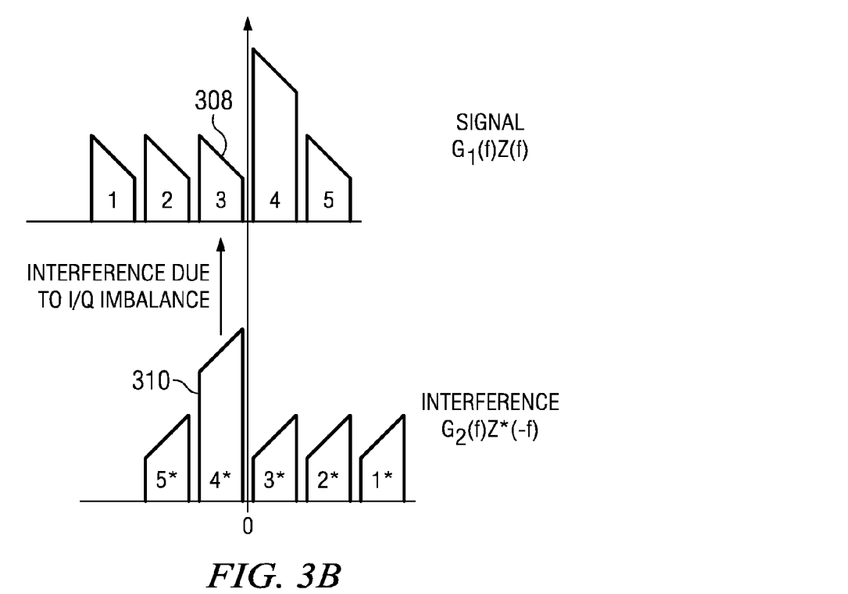
FIG. 3B is a diagram the five channels of FIG. 3A and their alias images after mixing.

For the purpose of illustration, if the local oscillator frequency ($f_C-f_{IF}$) is between channels 304 and 306, FIG. 3B illustrates the result after mixing signals of FIG. 3A at intermediate frequency. The upper five channels (1-5) are the desired signal $G_1(f)Z(f)$ from equation [1]. The lower five channels (1*-5*) are the interference signal $G_2(f)Z^*(f)$ from equation [1]. In particular, channel 308 receives significantly greater interference from adjacent image alias channel 310 than would be expected for a direct conversion receiver with $f_{IF}=0$. This is due to the significantly greater signal strength of adjacent image alias channel 310 relative to desired channel 308. The ACI, therefore, would produce a significantly higher bit error rate (BER) and a significantly lower signal to interference plus noise (SINR) ratio than with a direct conversion receiver.

Figure 4A:
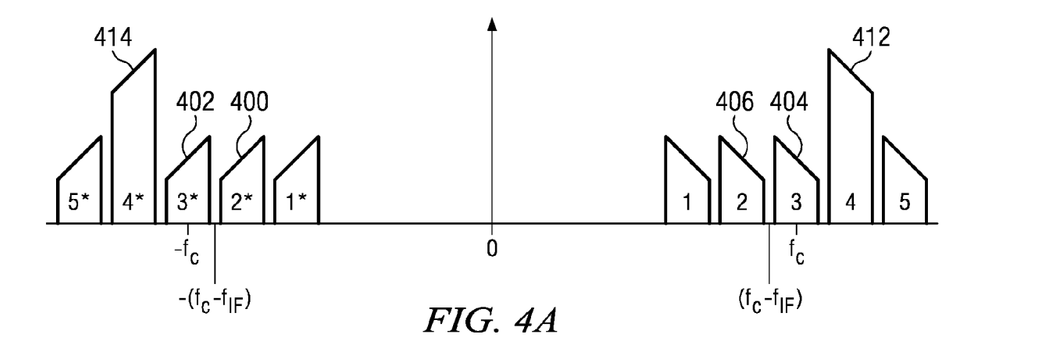
FIG. 4A is another diagram of five channels (1-5) and their alias images (1*-5*)

Turning now to FIG. 4A, there is a diagram of five channels (1-5) and their alias images (1*-5*) according to the present invention. The alias images are due to imbalance of in-phase and quadrature branches of the receiver (UE 109) as previously discussed. The desired channel 404 is indicated by center frequency ($f_C$). The corresponding alias image 402 is indicated by $-f_C$. Lower adjacent channel 406 has approximately the same signal strength as desired channel 404. Upper adjacent channel 412 has significantly greater signal strength than either desired channel 404 or lower adjacent channel 406. Likewise, the alias image 402 of desired channel 404 has approximately the same signal strength as alias image 400 and significantly less than the signal strength of alias image 414.

Figure 4B:
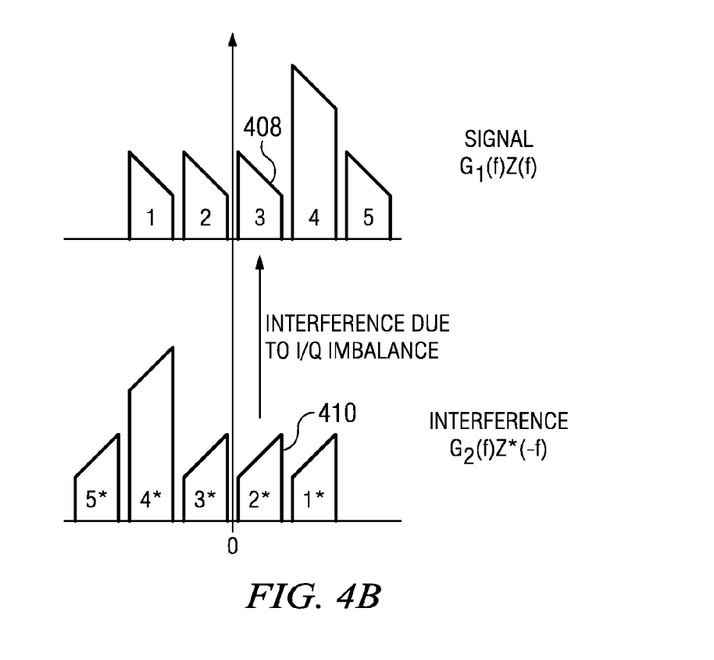
FIG. 4B is a diagram the five channels of FIG. 4A and their alias images after mixing according to the present invention.

In a preferred embodiment of the present invention, FIG. 4B illustrates the result after mixing signals of FIG. 4A when the local oscillator frequency ($f_C-f_{IF}$) is selected between desired channel 404 and adjacent channel 406. As previously discussed, the upper five channels (1-5) are the desired signal $G_1(f)Z(f)$ from equation [1]. The lower five channels (1*-5*) are the interference signal $G_2(f)Z^*(f)$ from equation [1]. Desired channel 408 receives significantly less interference from adjacent image alias channel 410 than previously observed in the example of FIG. 3B. In this example of the present invention, the ACI may be less than in channel interference due to flicker noise and DC offset for a direct conversion receiver with $f_{IF}=0$. This is due to the comparable signal strength of adjacent image alias channel 410 relative to desired channel 408. Appropriate selection of an intermediate frequency, therefore, significantly reduces ACI due to I/Q imbalance and produces a significantly lower bit error rate (BER) and a significantly higher signal to interference plus noise (SINR) ratio than with the example of FIG. 3B.

Figure 5A:
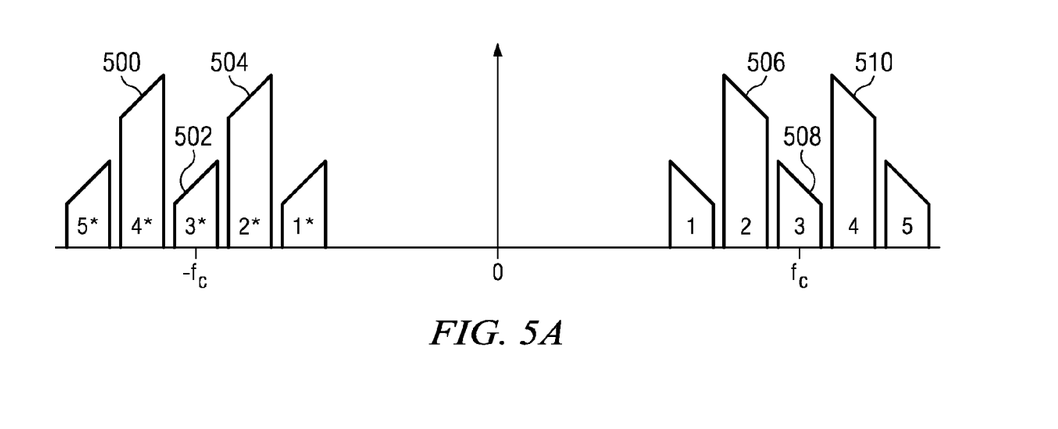
FIG. 5A is a third diagram of five channels (1-5) and their alias images (1*-5*)

Referring now to FIG. 5A, there is another diagram of five channels (1-5) and their alias images (1*-5*) according to the present invention. The alias images are due to imbalance of in-phase and quadrature branches of the receiver (UE 109) as previously discussed. The desired channel 508 is indicated by center frequency ($f_C$). The corresponding alias image 502 is indicated by $-f_C$. In this example, however, lower adjacent channel 506 and upper adjacent channel 510 have significantly greater signal strength than desired channel 508. Likewise, the alias image 502 of desired channel 508 has approximately the same signal strength as desired channel 508 but significantly less than either of adjacent channel alias images 500 and 504. Thus, selection of an intermediate frequency between desired channel 508 and either of adjacent channels 506 and 520 would produce significant ACI as previously discussed with regard to FIG. 3B.

Figure 5B:
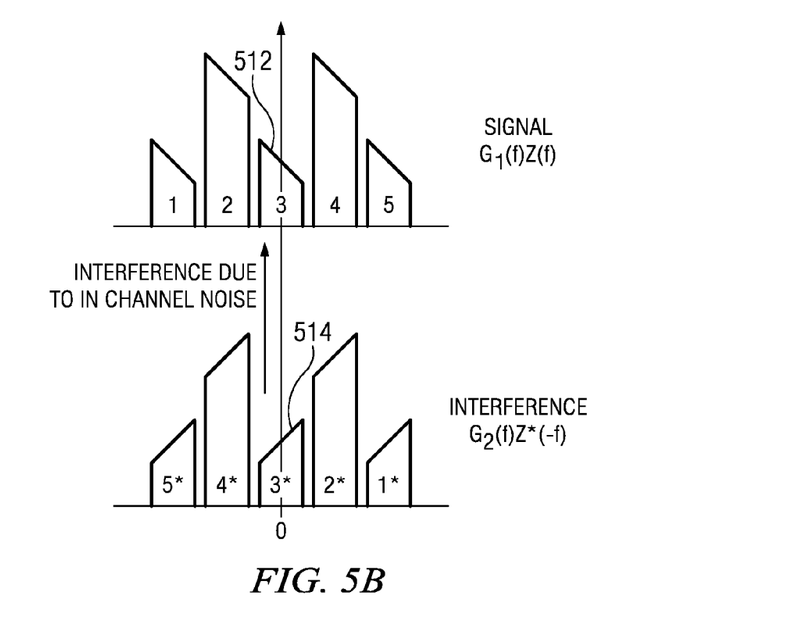
FIG. 5B is a diagram the five channels of FIG. 5A and their alias images after mixing according to the present invention.

In a preferred embodiment of the present invention, FIG. 5B illustrates the result after mixing the signals of FIG. 5A when an intermediate frequency of $f_{IF}=0$ is selected. In this case, the local oscillator frequency is simply the center frequency $f_C$, and the receiver directly converts the received RF signal to baseband. This effectively avoids ACI as previously discussed with regard to FIG. 3B. Here, however, the majority of interference in desired channel 512 is due to in channel components such as flicker noise and DC offset from image alias 514. In this example of the present invention, the in channel noise components may be significantly less than ACI from significantly stronger signals in adjacent upper and lower channels. Thus, appropriate selection of a zero intermediate frequency, produces a significantly lower bit error rate (BER) and a significantly higher signal to interference plus noise (SINR) ratio than with the ACI of FIG. 3B.

Figure 6:
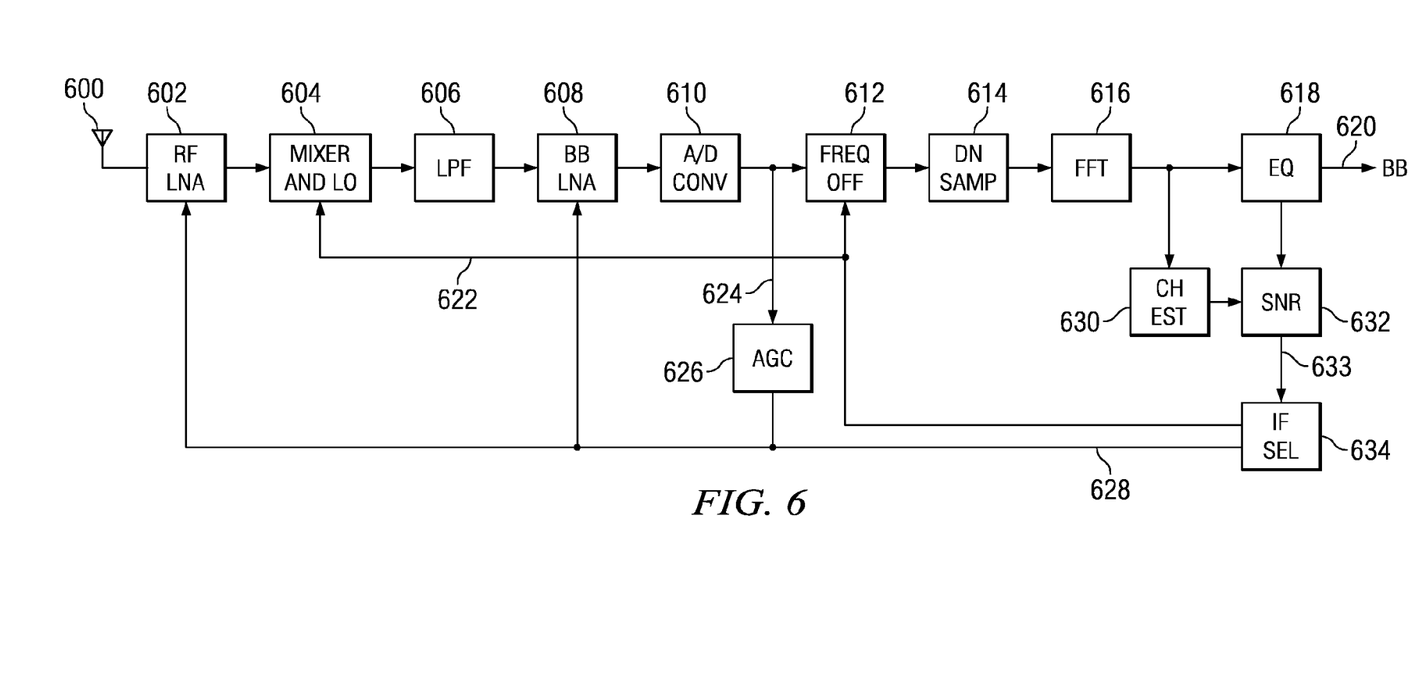
FIG. 6 is a block diagram of a receiver according to the present invention.

Referring now to FIG. 6, there is a block diagram of a receiver such as UE 109 (FIG. 1) according to the present invention for opportunistic selection of an intermediate frequency. The receiver includes one or more antennas 600 coupled to a RF low noise amplifier (LNA) 602. The RF LNA amplifies the received signal and applies it to mixer and local oscillator (LO) 604. Mixer/LO 604 receives a select signal on lead 622 from IF select circuit 634. Mixer/LO 604 mixes a selected local oscillator signal with the RF signal to produce a selected IF signal or a baseband signal as will be discussed in detail. The output signal from the mixer passes through low pass filter (LPF) 606 to baseband (BB) LNA 608. The BB LNA 608 further amplifies the signal and applies the output signal to analog-to-digital converter (ADC) 610. ADC 610 converts the analog signal to a digital signal on lead 624 that is M times greater than the baseband signal rate, where M is a positive integer. The digital signal on lead 624 is applied to automatic gain control (AGC) circuit 626. AGC circuit 626 produces a signal on lead 628 in response to the amplitude of the digital signal on lead 624. The signal on lead 628 is applied to IF select circuit 634 as an indication of received signal strength. The signal on lead 628 is also applied to RF LNA 602 and to BB LNA 608 to control the gain of each amplifier. The digital signal on lead 624 is further applied to frequency offset circuit 612. Frequency offset circuit 612 compensates for the frequency spectrum shift produced by mixer/LO 604 and applies the compensated signal to down sample circuit 614. Down sample circuit 614 samples the signal at an integral multiple of M to convert the IF signal to a baseband signal.

The baseband signal from down sample circuit 614 is applied to fast Fourier transform (FFT) circuit 616 to produce a frequency domain signal. The frequency domain signal is applied to channel estimate circuit 630. Channel estimate circuit 630 compensates for the channel effect of the received signal and applies the result to signal-to-noise ratio (SNR) circuit 632. The frequency domain signal from FFT circuit 616 is also applied to equalizer circuit 618 to produce an equalized baseband signal on lead 620. The equalized baseband signal is also applied to SNR circuit 632. SNR circuit 632 calculates a signal quality indicator on lead 633. This signal quality indicator may be a SNR, a bit error rate (BER), a signal-to-interference plus noise ratio (SINR), or other suitable indication of signal quality. IF select circuit 634 uses the signal quality indicator to determine the effect of in channel interference, such as flicker noise and DC offset. IF circuit 634 also uses the AGC signal on lead 628 to determine signal strength of desired channel as well as adjacent channels. Responsively, IF select circuit 634 selects an appropriate local oscillator frequency ($f_C-f_{IF}$) and applies a corresponding select signal to mixer/LO circuit 604 and frequency offset circuit 612. In a preferred embodiment of the present invention, the resulting local oscillator frequency ($f_C-f_F$) is between the desired channel and one of the adjacent lower and upper channels. Alternatively, when both of the adjacent lower and upper channels have significantly greater signal strength than the desired channel, IF select circuit 634 selects $f_{IF}=0$ so that mixer/LO circuit 604 directly converts the received RF signal to baseband.

Figure 7:
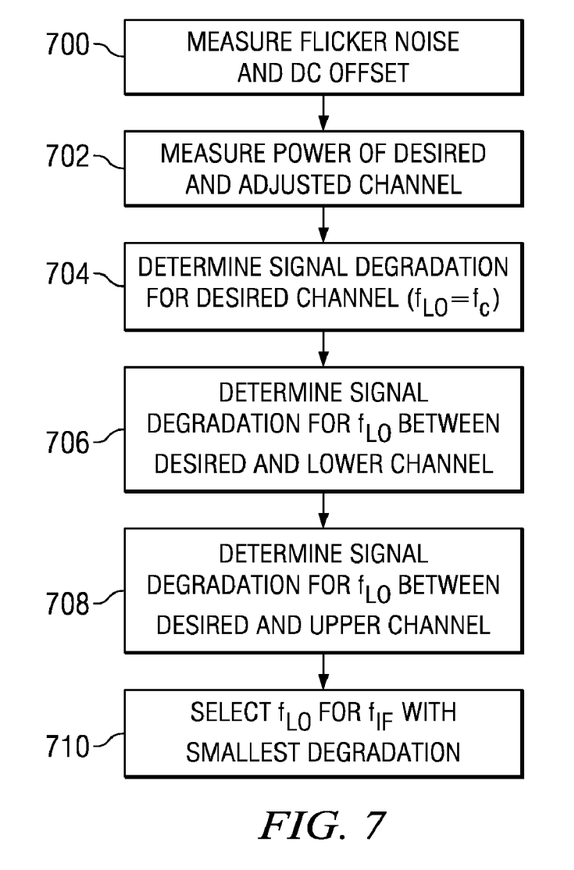
FIG. 7 is a flow chart showing a preferred method of intermediate frequency (IF) selection according to the present invention.

Turning now to FIG. 7, there is a flow chart showing a preferred method of intermediate frequency (IF) selection according to the present invention. The following steps need not proceed in the following order. The method begins at step 700 by measuring flicker noise, DC offset, and any other desirable in channel noise component. This may be performed during device characterization. Alternatively, it may be performed by SNR circuit 632 (FIG. 6) by measuring the receiver noise floor on an unused channel. Next, at step 702, the receiver measures the signal strength on the desired channel as well as on the lower and upper adjacent channels. This is preferably accomplished by selecting each channel sequentially and recording the value the of the respective AGC signal, since the AGC signal is proportional to received signal strength. At step 704, the receiver determines and records the signal quality indicator (on lead 633) on the desired channel for $f_{IF}=0$ or $f_{LO}=f_C$. As previously discussed, the signal quality indicator may be BER, SNR, SINR, or any other indicator corresponding to signal quality degradation. This includes the in channel noise components such as flicker noise and DC offset as well as I/Q imbalance. At step 706, the receiver determines and records the signal quality indicator when the LO frequency is selected between the desired channel and the lower adjacent channel. At step 708, the receiver determines and records the signal quality indicator when the LO frequency is selected between the desired channel and the upper adjacent channel. Finally, at step 710, the receiver selects the LO frequency that produces an IF frequency with the best signal quality indicator corresponding to the least signal degradation. This step is preferably performed by IF select circuit 634 (FIG. 6).

Figure 8:
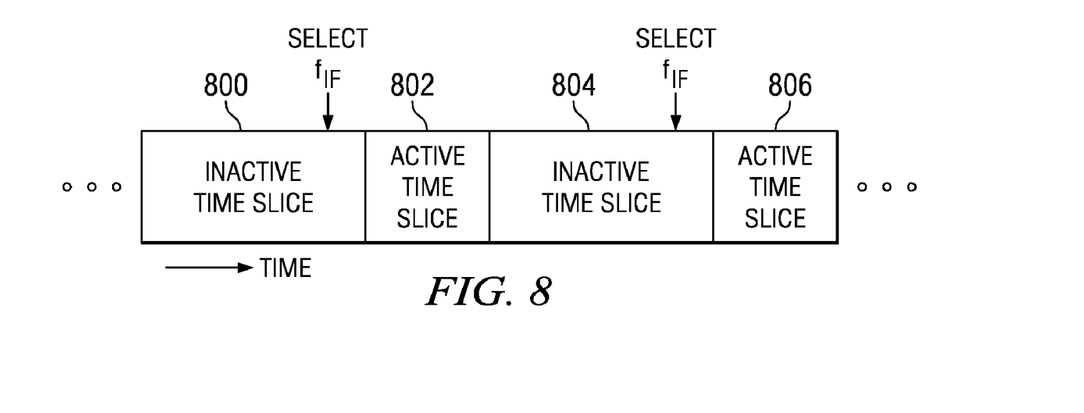
FIG. 8 is a diagram showing active and inactive time slices of a time multiplexed signal.

Referring now to FIG. 8, there is a diagram showing active and inactive time slices of a time multiplexed signal. In many environments the adjacent channel interference (ACI) changes as the receiver (UE 109) moves within the various coverage areas (FIG. 1). When the signals are time multiplexed, the receiver may perform the previously described measurements (FIG. 7) during inactive time slices. For example, FIG. 8 illustrates inactive time slices 800 and 804 as well as active time slices 802 and 806. The receiver preferably performs the steps of FIG. 7 and selects an intermediate frequency ($f_{IF}$) near the end of each inactive time slice as indicated. Alternatively, the receiver may select an intermediate frequency ($f_{IF}$) near the end of inactive time slices that are spaced apart in time.

Still further, while numerous examples have thus been provided, one skilled in the art should recognize that various modifications, substitutions, or alterations may be made to the described embodiments while still falling with the inventive scope as defined by the following claims. Other combinations will be readily apparent to one of ordinary skill in the art having access to the instant specification.

What is claimed is:

1. A method of selecting an intermediate frequency, comprising the steps of:
    measuring a power of a signal on a first channel;
    measuring a power of a signal on a lower channel adjacent the first channel;
    measuring a power of a signal on an upper channel adjacent the first channel;
    measuring an in channel interference on the first channel at a first intermediate frequency;
    measuring an adjacent channel interference on the first channel, at a second intermediate frequency; and
    selecting the intermediate frequency with the best signal quality, wherein a signal on the first channel is time multiplexed having inactive and active time slices, and wherein the step of selecting is performed during an inactive time slice.

2. A method as in claim 1, wherein the second intermediate frequency is produced by mixing a radio frequency (RF) signal with a local oscillator signal having a frequency between a frequency of the first channel and a frequency of one of a lower and an upper adjacent channel.

3. A method as in claim 1, comprising measuring flicker noise and direct current (DC) offset of an unused channel.

4. A method of selecting an intermediate frequency, comprising the steps of:
    measuring an in channel interference on a first channel at a first intermediate frequency;
    measuring a first adjacent channel interference on the first channel at a second intermediate frequency; wherein the second intermediate frequency is produced by mixing a radio frequency (RF) signal with a local oscillator signal having a frequency between a frequency of the first channel and a frequency of a lower adjacent channel;
    measuring a second adjacent channel interference on the first channel at a third intermediate frequency; wherein the third intermediate frequency is produced by mixing the radio frequency (RF) signal with a local oscillator signal having a frequency between a frequency of the first channel and a frequency of an upper adjacent channel; and
    selecting the intermediate frequency with the best signal quality.

5. A circuit, comprising:
    a select circuit arranged to produce a select signal in response to an in channel interference and an adjacent channel interference measurements on a first channel at a respective plurality of intermediate frequencies of zero or between a desired channel and one of the upper and lower adjacent channels;
    a local oscillator circuit coupled to receive the select signal, the local oscillator circuit producing a selected local oscillator signal in response to the select signal;
    a mixer circuit coupled to receive a radio frequency (RF) signal and the selected local oscillator signal, the mixer circuit producing a selected intermediate frequency signal in response to the radio frequency signal and the selected local oscillator signal; and
    a measurement circuit comprising an automatic gain control (AGC) circuit arranged to measure a signal-to-interference plus noise (SINR) ratio on the first channel and apply a resulting signal to the select circuit, wherein the resulting signal is one of a noise and a strength signal.

6. A wireless receiver, comprising:
    an antenna;
    a radio frequency (RF) amplifier coupled to the antenna;
    a mixer circuit coupled to receive a radio frequency (RF) signal from the RF amplifier, the mixer circuit producing a selected intermediate frequency signal in response to the radio frequency signal and a selected local oscillator signal, wherein a frequency of the selected intermediate frequency signal is zero or between a desired channel and one of the upper and lower adjacent channels;
    a local oscillator circuit coupled to receive a select signal, the local oscillator producing a selected local oscillator signal in response to the select signal;
    a select circuit arranged to produce the select signal in response to in channel interference and adjacent channel interference measurements on a first channel at a respective plurality of intermediate frequencies;
    a first measurement circuit arranged to measure noise on the first channel and produce a noise signal, the first measurement circuit applying the noise signal to the select circuit; and
    a second measurement circuit arranged to measure signal strength on the first channel and produce a signal strength signal, the second measurement circuit applying the signal strength signal to the select circuit.

7. A circuit as in claim 6, wherein the noise signal and the signal strength signal comprise the signal quality measurements.

* * * * *